Patented Jan. 8, 1952

2,581,370

UNITED STATES PATENT OFFICE 2,581,370

OXYALKYLATED HYDROXY ACETIC ACID-ESTERIFIED OXYALKYLATED PHENOL ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,774

20 Claims. (Cl. 260—53)

The present invention is concerned with certain new chemical products, compounds or compositions which have useful application in various arts. It includes methods or procedures for manufacturing said new chemical products, compounds, or compositions, as well as the products, compounds, or compositions themselves. Said new compositions are hydrophile synthetic products, which are the oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble water-insoluble, hydroxyacetic acid-esterified alkylene oxide-modified phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula

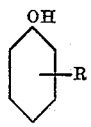

in which R is a hydrocarbon radical having at least 4 and not more than 12 carbon atoms and substituted in the 2,4,6 position; said resin being reacted with the aforementioned alkylene oxide so as to convert at least a majority of the phenolic hydroxyl per resin molecule into aliphatic hydroxyl radicals, but in a molecular proportion, so that less than two moles of the alkylene oxide are used for each phenolic hydroxyl; said alkylene oxide-modified phenol-aldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals, and, finally, said esterified oxide-modified phenol-aldehyde resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least two moles of alkylene oxide calculated on a total basis, both before and after esterification, be introduced for each phenolic nucleus present in the original, unmodified phenol-aldehyde resin.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 59,773, filed November 12, 1948, now Patent 2,541,990, granted February 20, 1951, as wetting. Other uses of the new products herein described are detergent and leveling agents in the laundry, textile and dyeing industries; as wetting agents and detergents in the acid washing of building stone and brick; as wetting agents and spreaders in the application of asphalt in road building and the like; as a constituent of soldering flux preparations; as a flotation reagent in the flotation separation of various aqueous suspensions containing negatively charged particles, such as sewage, coal washing waste water, and various trade wastes and the like, as germicides, insecticides, emulsifying agents, as for example, for cosmetics, spray oils, water-repellent textile finishes; as lubricants, etc.

Further supplementing the above aspect of our invention is the resin, containing alkanol radicals, and the hydroxyacetic acid ester thereof. Such hydroxyacetic acid ester is subjected to oxyalkylation, particularly oxyethylation, and employed as a demulsifier in the instant application. See our co-pending application Serial No. 59,775, filed November 12, 1948.

The present invention is concerned with certain synthetic products, which are oxyalkylated derivatives of certain resins previously referred to and hereinafter specified. In their simplest aspect the new substances may be exemplified by the following illustration:

Ordinary phenol or metacresyl reacts rapidly with an aldehyde to give a resin. This is true of other phenols, such as difunctional phenols. The reactivity of the ortho or para-hydrogen atoms is directly related to the phenolic structure. When the phenolic structure is altered, as, for example, conversion into a hydroxy-ether, such as the following:

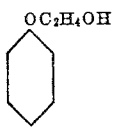

the reactivity of the para and hydrogen atoms is either eliminated as far as an aldehyde is concerned, or greatly reduced.

As far as we are aware, if such phenol is substituted even further, as, for example, the same derivative of difunctional phenol having the alkyl radical R in the para position, as illustrated by the following formula:

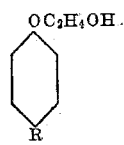

such compound is comparatively inactive towards aldehydes, and if it forms resins at all, presumably under some conditions, which, as yet, have not been determined.

What has been said in regard to the previous compound applies with even greater force and effect, if there were further modification, such as the formation of an ester, particularly an ester of a hydroxyacetic acid in which the hydroxyl is a primary alcoholic hydroxyl. Such compound may be illustrated by the following formula:

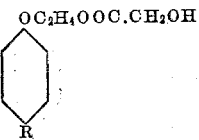

If it were possible to take a chemical compound of the above formula and resinify it by reaction with formaldehyde, for example, one would obtain a resin in which the structural unit can be depicted by the following formula:

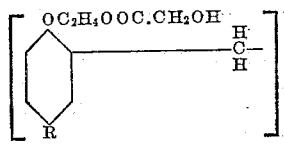

If such water-insoluble resin were then subjected to oxyalkylation, particularly oxyethylation, one would obtain a water-soluble compound, which, in an idealized manner, may be depicted as having a structural unit, such as the following:

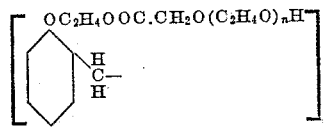

$n = 1$ to 20, at least sufficient to give surface-activity as subsequently described Such oxyalkylated resin is the demulsifier, or, at least, exemplifies one important aspect of the demulsifier employed in the instant invention.

Hypothetically, at least, one may consider the resin depicted by the previous formula as a phenolic resin, such as contemplated as a raw material in our previously mentioned co-pending applications Serial Nos. 8,722 and 8,723, both filed February 16, 1948, now Patents 2,499,365 and 2,499,366, granted March 7, 1950, respectively. Actually, such resins are not obtainable from the ester for reasons which have been indicated, and thus must be obtained indirectly, i. e., by first producing the resin from difunctional phenol and an aldehyde, subjecting such resin to reaction with less than two moles of ethylene oxide or the like for each phenolic hydroxyl, then esterifying the alcoholic radicals or substantially all the alcoholic radicals, with hydroxyacetic acid, and then subjecting such intermediate to a further reaction with an alkylene oxide, particularly ethylene oxide, as hereinafter described. Such oxyalkylated product then becomes the demulsifier employed in the instant process.

The hydroxy acetic acid-esterified oxyalkylated resins, used to provide the alcoholic radical of the new oxyalkylated products, are described in our Patent 2,541,990, granted February 20, 1951, while the phenol-aldehyde resins, which are oxyalkylated and then hydroxy acetylated to produce these alcoholic compounds are described in our Patent 2,499,370, granted March 7, 1950, and reference is made to these patents for a description of the phenol-aldehyde resins used, and their oxyalkylation and hydroxy acetylation to produce the alcoholic produce. For specific examples of the resins, reference is made to Examples 1a through 103a of Patent 2,499,370. For examples of oxyalkylated products derived from these resins, reference is made to Examples 1b through 59b in columns 19 through 22 of Patent 2,541,990. For examples of the hydroxy acetylated products reference is made to Examples 1c through 10c of Patent 2,541,990.

Referring now to these hydroxyacetic acid ester resins, illustrated by Examples 1c through 10c of Patent 2,541,990, which are subjected to oxyalkylation, particularly oxyethylation, to give synthetic compounds having at least minimum hydrophile properties, as hereinafter described, it is to be noted that the procedure is substantially the same as in the oxyalkylation, particularly oxyethylation, of resins obtained exclusively from difunctional phenols and aldehydes. The original resins, as prepared in the examples indicated by Example 1a, etc., of Patent 2,499,370 vary, from hard resins to viscous fluids. They vary in color from almost water-white to pale amber, amber, deep amber, or a reddish-black. The initial step of oxyalkylation reduces the state of the resin to a less viscous state, i. e., from a hard melting solid to a tacky solid, from a tacky solid, to a viscous liquid, from a viscous liquid to a thinner liquid, etc. A comparatively small amount of alkylene oxide added in the conversion into the polyhydric alcohol stage does not materially affect color. Similarly, esterification with hydroxyacetic acid seems to have substantially the same effect as far as physical appearance goes, to wit, in the direction of greater fluidity; in any event, in the direction going from a solvent to a liquid. There is not much change in color, although the tendency is to lighten the product. Thus, the esters subjected to the final oxyalkylation may vary from hard or sticky solids, or in some instances, to highly viscous fluids, sometimes pitch-like in character, to fluids of viscosity resembling castor oil, or even less, and sometimes comparatively thin fluids. Needless to say, when diluted with xylene or any other selected solvent, they show no appreciable viscosity at all.

Oxyalkylation is conducted in the presence of an alkaline catalyst. We have pointed out that in the composition of the esterification reaction, assuming that all the hydroxyacetic acid has been used up, the resulting product is either neutral or almost neutral. The latter would be particularly the case if a small amount of an organic catalyst, such as toluene sulfonic acid, had been added to the extent of about two-tenths of 1%, or ½%, to speed up the reaction. In any event, enough alkali, preferably a 25% caustic soda solution, is added to make the product at least neutral to methyl orange indicator. At this particular point the ester with a solvent present, or with the bulk of the solvent removed by distillation or vacuum distillation, to 150° to 180° C. is placed in an autoclave mixed with 1% to 2% of sodium methylate, based on the weight of the ester and subjected to oxyalkylation, particularly oxyethylation. Other alkaline catalysts can be used instead of sodium methylate, such as caustic soda, caustic potash, sodium oleate, etc.

Briefly, then, having obtained a suitable hydroxyacetic acid ester resin of the kind described, it is subjected to treatment with a low molal reactive alpha-beta olefine oxide, so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide, of course, may be considered as a hydroxypropylene oxide and methyl glycide as a hydroxybutylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds' gauge pressure (pounds per square inch). In a general way, the method employed is substantially the same procedure as used for oxyalkylation of other organic materials having reactive phenolic groups.

It is advantageous to conduct the oxyethylation in presence of an insert solvent, such as xylene, cymene, decalin, ethylene glycol diethylether, diethyleneglycol diethylether, or the like, although with many resins, the oxyalkylation proceeds satisfactorily without a solvent.

If a xylene solution is used in an autoclave, as hereinafter indicated, the pressure readings, of course, represent total pressure, i. e., the combined pressure, due to xylene and also due to ethylene oxide or whatever other oxyalkylating agent is used. Under such circumstances, it may be necessary at times to use substantial pressures to obtain effective results, for instance, pressures up to 300 pounds along the correspondingly high temperatures, if required.

As previously stated, by and large, the esters herein employed as the intermediate which is subjected to the final oxyalkylation stage, are apt to be liquids or pitch-like solids, but in any event, are apt to be liquid at the temperature of oxyalkylation. Therefore, it is usual that a solvent must be present, or most conveniently be present, as happened to be the case where one is oxyalkylating a high melting resin which might not even be particularly fluid at the temperature of oxy alkylation. Purely as a matter of convenience, we prefer to permit the solvent used, such as xylene, to be present during oxyalkylation, and if desired, could remove it after the oxyalkylation step. However, such solvent is not objectionable for numerous uses, such as demulsification, and therefore, is merely a matter of convenience. It is pointed out, however, that the solvent-free hydroxyacetic acid ester resin may be employed, or after oxyalkylation, the solvent may be removed.

Another suitable procedure is to use propylene oxide or butylene oxide as a solvent, as well as a reactant in the earlier stages along with ethylene oxide, for instance, by dissolving the powdered resin in propylene oxide, even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide, or butylene oxide, which can be eliminated by volatilization or distillation in any suitable manner.

Attention is directed to the fact that the resins herein described must be fusible or soluble in an organic solvent. Fusible resins invariable are soluble in one or more organic solvents, such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. The fact that the resin is soluble in an organic solvent, or the fact that it is fusible, means that it consists of separate molecules. Phenol-aldehyde hydroxyacetic acid ester resins of the type specified herein possess reactive hydroxyl groups and are oxyalkylation susceptible, although we are aware that esters are susceptible to oxyalkylation and that esters contain secondary alcohol radicals, such as triricinolein, or do not appear to be susceptible at this particular point of reactivity, yet from what we have been able to determine, we believe that in the case of the instant resins, that point of reactivity is the primary alcoholic radical of the hydroxyacetic acid residue.

Considerable of what is said immediately hereinafter is concerned with the ability to vary the hydrophile properties of the reactants used, from minimum hydrophile properties to maximum hydrophile properties.

Recapitulating what has been said, prior to the final oxyalkylation step, i. e., in the preparation of the phenol-aldehyde hydroxyacetic acid ester, it is to be noted that the following prevails:

(1) The resin molecule, as such, contained a minimum of at least three phenolic nuclei.

(2) The amount of alkylene oxide added, such as ethylene oxide, was at least sufficient to convert a majority of the alkanol radicals into hydroxyacetic acid radicals, and thus, as a corollary in the case of the minimum size resin with minimum alkanol conversion, i. e., a 3-unit resin with 2 phenols converted into alkanol radicals, one would have to convert both alkanol radicals into hydroxyacetic acid radicals, in order to meet prerequisite conversion.

(3) Regardless of whether conversion and esterification are at the minimum point, or at the maximum point, that is where 2n— one mole of alkylene oxide have been added to a resin molecule having a number of phenolic nuclei, even so, the resultant product prior to the final oxyalkylation step is (a) water-insoluble, (b) solvent-soluble, (c) devoid of hydrophile sub-surface-active or surface-active properties, as hereinafter described in reference to the final derivative.

Even more remarkable and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced whether phenolic, alkanol or the primary terminal hydroxyl of a hydroxyacetic acid radical. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol, as described immediately preceding, then, and in that event, hydrophile properties are indicated by the fact that one can produce an emulsion by having present 10% to 50% of an inert solvent such as xylene. All that one need to do is to have a xylene solution within the range of 50 to 90 parts, by weight, of oxyalkylated derivatives and 50 to 10 parts, by weight, of xylene and mix such solution with one, two or three times its volume of distilled water and shake vigorously so as to obtain an emulsion which may be of the oil-in-water type or the water-in-oil type (usually the former), but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water-soluble, it may be dissolved in ethyl or methyl alcohol, ethylene glycol diethylether, or diethylene glycol diethylether, with a little acetone added, if required, making a rather concentrated solution, for instance, 40% to 50%, and then adding enough of the concentrated alcohols or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as reactants, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaping and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 mols of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the reactants used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared, as herein described, and used as raw materials for the preparation of more elaborate derivatives, particularly in the absence of a secondary heating step, contain 3 to 6 or 7 phenolic nuclei with approximately 4½ to 5½ nuclei as an average. More drastic conditions of resinification yield resins of greater chain length. Such more intensive resinification is a conventional procedure and may be employed, if desired. Molecular weight, of course, is measured by any suitable procedure, particularly by crooscopic methods; but using the same reactants and using more drastic conditions of resinification, one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin, if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20, and, as far as we have been able to determine, such resins are free from methylol groups. As a matter of fact, it is probable that in acid-catalyzed resinification, the methylol structure may appear only momentarily at the very beginning of the reaction, and in all probability, is converted at once into a more complex structure during the intermediate stage.

One procedure which can be employed in the use of a new resin to prepare reactants for use in the preparation of compounds employed in the process of the invention, is to determine the hydroxyl value by the Verley-Bölsing method or its equivalent. The resin, as such, or in the form of a solution, as described, is then treated with ethylene oxide in presence of 0.5% to 2% of sodium methylate, as a catalyst in step-wise fashion. The conditions of reaction, as far as time or percent is concerned, are within the range previously indicated. With suitable agitation the ethylene oxide, if added in molecular proportion, combines within a comparatively short time; for instance, a few minutes to 2 to 6 hours, but in some instances, requires as much as 8 to 24 hours. A useful temperature range is from 125° to 225° C. The completion of the reaction of each addition of ethylene oxide in stepwise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50%, by weight, of the original resin, a sample is tested for incipient hydrophile properties, by simply shaking up in water as is, or after the elimination of the solvent, if a solvent is present. The amount of ethylene oxide used to obtain a useful demulsifying agent, as a rule, varies from 70%, by weight, of the original resin to as much as five or six times the weight of the original resin. In the case of a resin derived from para-tertiary butylphenol, as little as 50%, by weight of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

The procedure used in the second oxyalkylation step is, of course, the same procedure as was used in the first step, as exemplified by Examples 1b of Patent 2,541,990, and following examples. However, in that particular case the amount of alkylene oxide added was at a minimum, the purpose being only to convert the majority of all phenolic hydroxyls into alkanol hydroxyls, and to avoid introducing hydrophile character of the kind previously specified as being a necessary prerequisite of a final derivative. In the last and final step of oxyalkylation one was no longer interested in introducing alkanol groups for reaction with hydroxyacetic acid, but is, in fact, concerned with the introduction of hydrophile properties so as to make the final derivative hydrophile, sub-surface-active, or surface-active, as defined. Therefore, the amount of alkylene oxide introduced is much larger, the time required is usually longer, and a wide variety of derivatives are obtainable. Finally, during this extended period of reaction, cross-linking may take place for a variety of reasons, some of which have been referred to and others of which were obvious, in light of what has been said herein. With this in mind, the subsequent examples illustrating this final stage of oxyalkylation will be included, although it may not be necessarily required.

Attention is directed to the fact that in the subsequent examples reference is made to the step-wise addition of the alkylene oxide, such as ethylene oxide. It is understood, of course, that there is no objection to the continuous addition of alkylene oxide until the desired stage of reaction is reacted. In fact, there may be less of a hazard involved, and it is often advantageous to add the alkylene oxide slowly in a continuously stream and in such amount as to avoid exceeding the higher pressures noted in the various examples or elsewhere.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface-activity show unusual properties as the hydrophile character varies from a minimum to an ultimate maximum. One should not underestimate the utility of any of these products in a surface-active or sub-surface-active range, without testing them for the purpose in mind, such as demulsification. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol, when viewed in a comparatively thin layer, for instance, the depth of a test tube. Ultimate hydrophile character is usually shown at the 15 to 1 ratio test, in that adding a small amount of an insoluble solvent, for instance, 5% of xylene, yields a product which will give, at least temporarily, a transparent or translucent sol of the kind just described. The formation of a permanent foam, when a 0.5% to 5.0% aqueous solution is shaken, is an excellent test for surface-activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75%, by weight, for example, 65%, by weight, of the resin to be oxyethylated; a second example using approximately 200% to 300%, by weight, and a third example using about 500% to 750%, by weight, to explore the range of hydrophile-hydrophobe balance.

A practical examination of the factor of oxyalkylation level can be made by a very simple test, using a pilot plant autoclave having a capacity of about 10 to 15 gallons, as hereinafter described. Such laboratory-prepared routine compounds can then be tested for solubility, and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which is usually butyl, amyl, or phenyl.

Knowing the approximate molecular weight properties of the resin, whether purchased in the open market or prepared, and making the appropriate calculations for the addition of the alkylene oxide, such as ethylene oxide, followed by esterification with hydroxyacetic acid, as specified, one can readily calculate the approximate molecular weight or the acetyl or hydroxyl number per resin molecule, or per original gram mole, or pound mole of phenol employed. With such information one is in a position to add the alkylene oxide, such as ethylene oxide, based on either exact molar ratios or approximate molar ratios, which are more than satisfactory for the purpose involved.

Using such an approximate weight, one need only introduce, for example, one molal weight of ethylene oxide, or slightly more, perhaps at times two moles of ethylene oxide, or slightly more, to produce minimum hydrophile character. In calculating the amount of alkylene oxide required to produce minimum hydrophile character, it is our experience that one can include all the alkylene oxide added, to wit, the amount added prior to the esterification step and that added after the esterification step. Usually, two moles of ethylene oxide or slightly more on this total basis is sufficient to yield a product of minimal hydrophile character. Further oxyalkylation gives enhanced hydrophile character. Although we have prepared and tested a number of oxyethylated derivatives of the kind described herein, we have found no instance where the use of less than two moles of ethylene oxide per original phenolic nuclei, including the oxide added before and after esterification, gave desirable properties.

*Example 1d*

The product, subsequent to oxyalkylation, and more specifically oxyethylation, is the esterified polyhydroxy alcohol obtained as described under the heading of Example 1c. In recapitulation, 162 grams of the original resin with solvent were treated with 44 grams of ethylene oxide, and subsequently, with 76 grams (anhydrous basis) of hydroxyacetic acid to yield 264 grams of the esterified resin. This amount of the product, equivalent for practical purposes, to a gram mole, together with part of the solvent used in the prior process, particularly during esterification, was mixed with an alkaline catalyst and subjected to oxyethylation. Before adding the alkaline catalyst, however, the solution of the esterified resin is checked for acidity or alkalinity. If desired, enough concentrated caustic soda or caustic potash should be added (25% or 30% solution) to make a resin solution at least alkaline to methyl orange indicator, and if desired, a little more alkali may be added so as to bring the "neutral point" closer to showing alkalinity to phenol phthalate indicator. If such precaution is not taken, particularly where an organic sulfonic acid has been used as a catalyst, some of the sodium methylate subsequently employed will be wasted and oxyalkylation will proceed at a slow rate. Incidentally, oxyalkylation can be speeded up by using considerably more sodium methylate than shown in the subsequent table, i. e., instead of using 1.33 sodium methylate, one may use 50% more, i. e., 2% sodium methylate.

In actual experimentation we have permitted part of the xylene used during esterification to distil out and be removed by the phase-separating trap arrangement previously referred to. As previously pointed out, if desired, all the solvent could be removed by distillation, including vacuum distillation, or more solvent could be added. As a matter of convenience, we have employed 264 grams of the resin, as previously noted, and 36 grams of solvent, making the total weight of the mixture 400 grams. To this we added 1⅓% of sodium methylate, based on the solvent-free ester. This amounted to 3.5 grams of sodium methylate. Any of the other alkaline catalysts previously described could be used. This mixture of esterified resin, solvent, and sodium methylate was placed in a conventional autoclave. The amount of ethylene oxide added at this stage was an amount approximately equal in weight to the weight of the esterified resin, being a total of about 260 grams in four additions of 65 grams each. The time required to add each batch of ethylene oxide varied from about 2½ to 4 hours, the temperature from about 155° to 180° C., and the pressure from approximately 125 to 165. Specific details in regard to each addition are given in the table which follows immediately after the description of Example 12d.

As previously noted, during such addition, varying from 2½ to 4 hours, the point is reached where there is no further drop in pressure, thus indicating that all the ethylene oxide present has reacted and the pressure registered on the gauge represents the vapor pressure of xylene at indicated temperature. The table indicates the change in solubility as oxyethylation progresses.

If one speeds up the stirring device from a normal speed of approximately 180 to 200 R. P. M., to approximately 250 to 280 or thereabouts, the reaction takes place more rapidly. This is true also if more catalyst is added. We prefer to keep the catalyst at not more than 2% at the most.

In one such operation the resultant, when cold, was a viscous, opaque liquid, readily emulsifiable in water, even in the presence of the added xylene. This indicates that the incipient emulsification, in absence of xylene, probably appeared at the completion of the second, or in any event, the third, addition of ethylene oxide. In other words, the addition of about 110 to 165 grams of ethylene oxide is sufficient to give significant hydrophile properties, in the absence of xylene, and even noticeable hydrophile properties in the presence of xylene. Note, however, that there had been added previously a gram mole (44 grams) of ethylene oxide prior to the esterification stage. The initial hydrophile point approximates total ethylene oxide (both first stage addition and final second-stage addition) equal to or perhaps slightly less than 100% weight of the original unesterified resin, i. e. the phenolaldehyde resin, as described in Example 1a and subsequent examples of Patent 2,499,370. In this instance, in order to obtain greater solubility, the amount of ethylene oxide used for reaction was increased by a second series of additions, using substantially the same conditions of reaction as previously noted. Such series was continued until, as an upper limit, approximately 700 grams of ethylene oxide had been introduced, i. e., an amount which was almost three times the weight of the esterified resin and almost four times the weight of the original phenol-aldehyde resin described under the heading of Example 1a. See the attached table for data in which the ratio of alkylene oxide as added is sufficient to give excellent solubility and to yield compounds which are distinctly valuable for numerous purposes and particularly for demulsification. The compound as prepared, as above indicated, was light amber in color, miscible in water and had a viscosity somewhat less than that of castor oil.

*Example 2d*

The same reactants and procedure were employed as in Example 1d, preceding, except that propylene oxide was employed instead of ethylene oxide. The resultant, even on the addition of the alkylene oxide in the weight proportions of the previous example, has diminished hydrophile properties in comparison with the resultants of Example 1d. This illustrates the point that propylene oxide and butylene oxide give products of lower levels of hydrophile properties than does ethylene oxide.

*Example 3d*

The same reactants and procedures were followed as in Example 1d, except that one mole of glycide was employed initially per hydroxyl radical. This particular reaction was conducted with extreme care and the glycide was added in small amounts representing fractions of a mole. Ethylene oxide was then added, following the procedure of Example 1d, to produce products of greater hydrophile properties. We are extremely hesitant to suggest even the experimental use of glycide and methylglycide, for the reason that disastrous results may be obtained even in experimentation with laboratory quantities.

*Example 4d*

The same procedure was followed as in Example 1d, except that instead of employing the esterified resin employed in Example 1d, there was substituted instead 264 grams of resin of Example 2c of Patent 2,541,990. The product obtained was similar in appearance, color and viscosity to that of Example 1d.

*Example 5d*

The same procedure was followed as in Example 1d, except that instead of employing the esterified resin employed in Example 1d, there was substituted instead 278 grams of resin of Example 3c of Patent 2,541,990. The product obtained was similar in appearance, color and viscosity to that of Example 1d.

*Example 6d*

The same procedure was followed as in Example 1d, except that instead of employing the esterified resin employed in Example 1d, there was substituted instead 320 grams of resin of Example 4c of Patent 2,541,990. The product obtained was similar in appearance, color and viscosity to that of Example 1d.

*Example 7d*

The same procedure was followed as in Example 1d, except that instead of employing the esterified resin employed in Example 1d, there was substituted instead 284 grams of resin of Example 5c of Patent 2,541,990. The product obtained was similar in appearance, color and viscosity to that of Example 1d.

Example 8d

The same procedure was followed as in Example 1d, except that instead of employing the esterified resin employed in Example 1d, there was substituted instead 346 grams of resin of Example 6c of Patent 2,541,990. The product obtained was similar in appearance, color and viscosity to that of Example 1d.

Example 9d

The same procedure was followed as in Example 1d, except that instead of employing the esterified resin employed in Example 1d, there was substituted instead 334 grams of resin of Example 7c of Patent 2,541,990. The product obtained was similar in apperance, color and viscosity to that of Example 1d.

Example 10d

The same procedure was followed as in Example 1d, except that instead of employing the esterified resin employed in Example 1d, there was substituted instead 326 grams of resin of Example 8c of Patent 2,541,990. The product obtained was similar in appearance, color and viscosity to that of Example 1d.

Example 11d

The same procedure was followed as in Example 1d, except that instead of employing the esterified resin employed in Example 1d, there was substituted instead 348 grams of resin of Example 9c of Patent 2,541,990. The product obtained was similar in appearance, color and viscosity to that of Example 1d.

Example 12d

The same procedure was followed as in Example 1d, preceding, except that the esterified resin subjected to oxyethylation was a partial ester and not a total ester. It was obtained by employing 57 grams of anhydrous hydroxystearic acid instead of 76 grams. This meant that the product subjected to oxyethylation in the final stage was a partial ester and not a complete ester. However, the remaining alkanol radical, assuming approximately 4 units per resin molecule, is, of course, as susceptible to oxyethylation as the hydroxyacetic acid radical. For this reason, no change was made in the amount of ethylene oxide added, but the amount of esterified resin employed was slightly less than in Example 1d, being 250 grams in the instant experiment.

| Ex. No. Final Derivative | From Ester Ex. No. of Patent 2,541,990 | Derived in turn from Ex. No. of Patent 2,541,990 | Derived from Resin Ex. No. of Patent 2,499,370 | Wt. of Ester Resin | Wt. of Solvent (Xylene) | Wt. of Na. Methylate |
|---|---|---|---|---|---|---|
| | | | | Grams | Grams | Grams |
| 1d | 1c | 1b | 1a | 264 | 136 | 3.5 |
| 4d | 2c | 4b | 2a | 264 | 136 | 3.5 |
| 5d | 3c | 5b | 3a | 278 | 122 | 3.7 |
| 6d | 4c | 6b | 8a | 320 | 130 | 4.3 |
| 7d | 7c | 7b | 9a | 284 | 116 | 3.8 |
| 8d | 6c | 45b | 69a | 346 | 154 | 4.6 |
| 9d | 7c | 51b | 70a | 334 | 166 | 4.5 |
| 10d | 8c | 50b | 71a | 326 | 174 | 4.4 |
| 11d | 9c | 59b | 72a | 348 | 152 | 4.8 |
| 12d | [1] 1c | 16b | 1a | 250 | 150 | 3.3 |

[1] Modification as described under heading 12d.

FIRST ADDITION

| Ex. No. Final Derivative | Amt. of EtO added | Max. Temp., °C., during Oxyethl. | Max. Gauge Press., lb./sq. in., during Oxyeth. | Time required to complete Oxyeth. | Solubility [2] |
|---|---|---|---|---|---|
| | Grams | | | Hours | |
| 1d | 65 | 140 | 158 | 5¼ | A. |
| 4d | 65 | 155 | 154 | 4¾ | A. |
| 5d | 70 | 145 | 130 | 4½ | A. |
| 6d | 80 | 135 | 112 | 4¼ | A. |
| 7d | 75 | 155 | 152 | 3 | A. |
| 8d | 85 | 142 | 125 | 6 | A. |
| 9d | 85 | 140 | 100 | 1½ | A. |
| 10d | 80 | 138 | 110 | 2¾ | A. |
| 11d | 90 | 135 | 168 | ¾ | A. |
| 12d | 65 | 142 | 152 | 4¾ | A. |

[2] See end of tables showing solubility characteristics indicated by letters A, B, C, etc.

SECOND ADDITION

| Ex. No. Final Derivative | Amt. of EtO added | Max. Temp., °C., during Oxyethl. | Max. Gauge Press., lb./sq. in., during Oxyeth. | Time required to complete Oxyeth. | Solubility [2] |
|---|---|---|---|---|---|
| | Grams | | | Hours | |
| 1d | 65 | 160 | 140 | 4¾ | A to B. |
| 4d | 65 | 162 | 144 | 5 | A to B. |
| 5d | 70 | 148 | 132 | 3¼ | A to B. |
| 6d | 80 | 155 | 130 | 6 | A to B. |
| 7d | 75 | 150 | 150 | 8 | B. |
| 8d | 85 | 140 | 140 | 5½ | A. |
| 9d | 85 | 138 | 110 | 1½ | A to B. |
| 10d | 80 | 156 | 105 | 3½ | A to B. |
| 11d | 90 | 180 | 150 | 1¼ | A to B. |
| 12d | 65 | 142 | 138 | 5¼ | A to B. |

THIRD ADDITION

| Ex. No. Final Derivative | Amt. of EtO added | Max. Temp., °C., during Oxyethl. | Max. Gauge Press., lb./sq. in., during Oxyeth. | Time required to complete Oxyeth. | Solubility [2] |
|---|---|---|---|---|---|
| | Grams | | | Hours | |
| 1d | 65 | 160 | 165 | 5 | C to D. |
| 4d | 65 | 158 | 155 | 4 | D. |
| 5d | 70 | 140 | 153 | 3¾ | C. |
| 6d | 80 | 140 | 130 | 7 | C. |
| 7d | 75 | 128 | 85 | 1½ | D. |
| 8d | 85 | 146 | 124 | 4 | C. |
| 9d | 85 | 155 | 85 | 7 | C. |
| 10d | 80 | 155 | 105 | 3½ | C. |
| 11d | 90 | 145 | 195 | 2 | C to D. |
| 12d | 65 | 153 | 140 | 4½ | D. |

[2] See end of tables showing solubility characteristics indicated by letters A, B, C, etc.

FOURTH ADDITION

| Ex. No. Final Derivative | Amt. of EtO added | Max. Temp., °C., during Oxyethl. | Max. Gauge Press., lb./sq. in., during Oxyeth. | Time required to complete Oxyeth. | Solubility [3] |
|---|---|---|---|---|---|
| | Grams | | | Hours | |
| 1d | 65 | 158 | 155 | 4½ | D to E. |
| 4d | 65 | 150 | 164 | 3¾ | E. |
| 5d | 70 | 162 | 130 | 2½ | D. |
| 6d | 80 | 138 | 120 | 3¾ | D. |
| 7d | 75 | 150 | 98 | 1½ | D to E. |
| 8d | 85 | 156 | 132 | 4½ | C to D. |
| 9d | 85 | 152 | 115 | 1½ | C to D. |
| 10d | 80 | 155 | 122 | 3½ | C to D. |
| 11d | 90 | 150 | 105 | 2 | C to D. |
| 12d | 65 | 160 | 128 | 3 | D to E. |

[3] Solubility of product after each addition of EtO:
A—insoluble or very slightly soluble.
B—distinctly becoming soluble.
C—emulsifiable.
D—soluble to give good suspension or sol.
E—clearly or almost clear solution.

In appearance the final oxyethylated products, in the presence of the solvent, were, in general, liquids of varying viscosities, and being in color from light amber to dark brown. The viscosity varies from that of castor oil to somewhat less. The products dissolve in water to give suspensions, sols, and clear or almost clear solutions.

The foregoing description of the appearance, etc., of the final oxyethylated products with respect to which data are given in the table, relates to the properties of the products in the presence of the solvent. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

Examples 1d, and subsequent examples, illustrate the addition of an amount of ethylene oxide equivalent to about four or five moles per phenolic hydroxyl present in the original resin. Such products have very desirable properties for various industrial applications, as noted. However, the amount of ethylene oxide may be double this amount, triple this amount, or even quadruple this amount. In other words, instead of adding four or five moles of ethylene oxide per phenolic nucleus present in the original resin, one may add as much as 15 to 20 moles of ethylene oxide or other alkylene oxide.

Previous reference has been made to the ratio of alkylene oxide to add, and as we have previously pointed out this can be predetermined using laboratory tests. It is our actual preference, however, from a practical standpoint, to make tests on a small pilot plant scale. Our reason for doing so is that we make one run, and only one, and we have a complete series which shows the progressive effect of introducing the oxyalkylating agent, for instance, the ethyleneoxy radical. Our preference is as follows: We prepare a suitable esterified resin of the kind as exemplified by Example 1c of Patent 2,541,990. We use approximately eight pounds of such resin and four pounds of xylene and place the esterified resin and xylene in a suitable autoclave with an open reflux condenser. We then add a catalyst which may be 2% of caustic soda, based on the weight of resin employed. The caustic soda may be used as a 20% to 30% solution in water and the water of solution or formation may be removed by means of the reflux condenser and the customary phase-separating trap. We then shut off the reflux condenser and use the equipment as an autoclave only, and oxyethylate until a total of 60 pounds of ethylene oxide have been added, equivalent to 750% of the original resin. We prefer a temperature of about 150° to 160° C. We take samples at intermediate points, as indicated in the following table:

| Percentage | Pounds of Ethylene Oxide added per 8 pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measure in any one of the usual ways using a Du Nouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Another reason why we prefer to use a pilot plant test of the kind above described is that we can use the same procedure to evaluate tolerance towards a trifunctional phenol such as hydroxybenzene or metacresol satisfactorily. Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin derived from a mixture of phenols having present 1% or 2% of a trifunctional phenol which will result in an insoluble rubber at the ultimate stages of oxyethylation, even though there has been an intermediate esterification stage, and notwithstanding the fact that such cross-linking did not take place in the initial resinification stage or the first oxyalkylation stage. In other words, with resins of the kind described obtained from certain phenols which originally may have contained a very small amount of a trifunctional phenol, one may find that the addition of two or three moles of the oxyalkylating agent per phenolic nucleus, particularly ethylene oxide, to the final intermediate, i. e., the esterified product, gives a surface-active product which is perfectly satisfactory, while more extensive oxyethylation yields an insoluble rubber, i. e., an unsuitable product. It is obvious that this present procedure of evaluating trifunctional phenol tolerance is more suitable than the previous procedure.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency towards a rubbery stage, is not objectionable, so long as the final product is still hydrophile and at least sub-surface-active. Such material frequently is best mixed with a polar solvent, such as alcohol or the like, and preferably, an alcoholic solution is used. The point which we want to make here, however, is this: Stringiness or rubberization at this stage may possibly be the result of etherification. Obviously, if a difunctional phenol and an aldehyde produce a non-cross-linked resin and if such molecule is treated in an initial manner, as described, with an alkylene oxide, such as ethylene oxide, and hydroxyacetic acid, as described, it is obvious that during the final oxyethylation stage, if one introduces a plurality of hydroxyl groups in each molecule, esterification can take place. If such esterification does take place, whether involving ethanol radicals or hydroxyacetic acid radicals, or both, it would amount to cross-linking, or in a general way, would have the same effect as if cross-linking took place in an earlier stage. Ordinarily, there is little or no tendency towards etherification during the final oxyalkylation step. If it does take place at all, it is only to an insignificant and unrecognizable degree. However, suppose that a certain weight of esterified resin is treated with an equal weight of or twice its weight of ethylene oxide. This may be done in a comparatively short time, for instance, at 150° or 175° C. in four to eight hours, or even less. On the other hand, if in an exploratory reaction, such as the kind previously described, the ethylene oxide were added extremely slowly in order to take step-wise samples, so that the reaction required four or five times as long to introduce an equal amount of ethylene oxide employing the same temperature, then etherification might cause stringiness or a suggestion of rubberiness. For this reason, if in an exploratory experiment of the kind previously described, there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

We do not know to what extent oxyalkylation produces uniform distribution in regard to phenolic hydroxyls present in the resin molecule. In some instances, of course, such distribution cannot be uniform, for the reason that we have not specified that the molecules of ethylene oxide, for example, be added in multiples of the units present in the resin molecule. This may be illustrated in the following manner:

Suppose that the original phenol-aldehyde resin happens to have five phenolic nuclei and that the esterified alkylene oxide resin likewise contains fixe hydroxyls, at least a majority or all being hydroxyacetic acid hydroxyls, or if not, the others being either phenolic or alkanol hydroxyl radicals. If a minimum of two moles of ethylene oxide are added after esterification based on the original phenolic nuclei are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide, there is no way to be certain that all chains would have 5 units; there might be some having, for example, 4 and 6 units, or, for that matter, 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter, derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination, and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

Reference to cryoscopic measurement is concerned with the use of benzene or other suitable compounds as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low-stage resin is subjected to a vacuum distillation treatment, as previously described, one obtains a resin of a distinctly higher molecular weight. Any molecular weight determination used, whether cryoscopic measurement, or otherwise, other than the conventional cryoscopic one employing benzene, should be checked so as to insure that it gives consistent values on such conventional resins as a control. Frequently, all that is necessary to make an approximation of the molecular weight range is to make a comparison with the dimer obtained by chemical combination of two moles of the same phenol, and one mole of the same aldehyde under conditions to insure dimerization. As to the preparation of dimers from substituted phenols, see Carswell "Phenoplasts," page 31. The increased viscosity, resinous character, and decreased solubility, etc., of the higher polymers, in comparison with the dimer, frequently are all that is required to establish that the resin contains 3 or more structural units per molecule.

It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself. As an example of such procedure, reference is made to our co-pending application Serial No. 726,201, filed February 3, 1947, now abandoned.

Having thus described our invention, what we claim as new and desire to secure by Letters Patent is:

1. Hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, hydroxyacetic acid-esterified alkylene oxide-modified phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula:

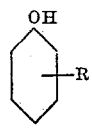

in which R is a hydrocarbon radical having at least 4 and not more than 12 carbon atoms and substituted in one of the positions ortho and para; said resin being reacted with the aforementioned alkylene oxide so as to convert at least a majority of the phenolic hydroxyls per resin molecule into aliphatic hydroxyl radicals but in a molecular proportion, so that less than two moles of the alkylene oxide are used for each phenolic hydroxyl; said alkylene oxide-modified phenol-aldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals, and finally, said esterified alkylene oxide-modified phenol-aldehyde resin being characterized by the introduction into the resin molecule at the hydroxyl groups of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least two moles of alkylene oxide calculated on a total basis, both before and after esterification, be introduced for each phenolic nucleus present in the original unmodified phenolaldehyde resin.

2. Hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, hydroxyacetic acid-esterified alkylene oxide-modified phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula:

in which R is a hydrocarbon radical having at least 4 and not more than 12 carbon atoms and substituted in one of the positions ortho and para; said resin being reacted with the aforementioned alkylene oxide so as to convert at least a majority of the phenolic hydroxyls per resin molecule into aliphatic hydroxyl radicals but in a molecular proportion, so that less than two moles of the alkylene oxide are used for each phenolic hydroxyl; said alkylene oxide-modified phenol-aldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals, and finally, said esterified alkylene oxide-modified phenol-aldehyde resin being characterized by the introduction into the resin molecule at the hydroxyl groups of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least two moles of alkylene oxide calculated on a total basis, both before and after esterification, be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

3. Hydrophile synthetic products; said hydrophile synthetic products being oxyethylation products of (A) an ethylene oxide, and (B) and oxyethylation-susceptible, fusible, organic solvent - soluble, water - insoluble, hydroxyacetic acid-esterified ethylene oxide-modified phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula

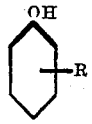

in which R is a hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals but in a molecular proportion, so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and finally, said esterified ethylene oxide-modified phenol-aldehyde resin being characterized by the introduction into the resin molecule at the hydroxyl groups of a plurality of divalent radicals having the formula $(C_2H_4O)_n$, and $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

4. Hydrophile synthetic products; said hydrophile synthetic products being oxyethylation products of (A) an ethylene oxide, and (B) an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula:

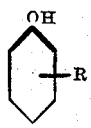

in which R is a hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals, but in a molecular proportion, so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and finally, said esterified ethylene oxide-modified phenol-aldehyde resin being characterized by the introduction into the resin molecule at the hydroxyl groups of a plurality of divalent radicals having the formula $(C_2H_4O)_n$, and $n$ is a numeral varying from 1 to 20; with the proviso that at least two moles of ethylene oxide calculated on a total basis both before and after esterification be introduced for each phenolic nucleus present in the original unmodified phenyl-aldehyde resin; and with the final proviso that the hydrophile properties of said final oxyalkylated resin in an equal weight of xylene are sufficient to produce an emulsion when said xylene solution is shaken vigorously with one to three volumes of water.

5. Hydrophile synthetic products; said hydrophile synthetic products being oxyethylation products of (A) an ethylene oxide, and (B) an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula:

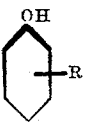

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals but in a molecular proportion, so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and finally, said esterified ethylene oxide-modified phenol-aldehyde resin being characterized by the introduction into the resin molecule at the hydroxyl groups of a plurality of divalent radicals having the formula $(C_2H_4O)_n$, and $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

6. Hydrophile synthetic products; said hydrophile synthetic products being oxyethylation products of (A) an ethylene oxide, and (B) an oxyethylation-susceptible, fusible, organic solvent - soluble, water - insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and having one functional group reactive towards said phenol; said resin being formed in the substantial absence of phenols of functionality greater than 2; said phenol being of the formula:

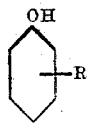

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and finally, said esterified ethylene oxide-modified phenol-aldehyde resin being characterized by the introduction into the resin molecule at the hydroxyl groups of a plurality of divalent radicals having the formula $(C_2H_4O)_n$, and $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

7. Hydrophile synthetic products; said hydrophile synthetic products being oxyethylation products of (A) an ethylene oxide, and (B) an oxyethylation-susceptible, fusible, organic solvent - soluble, water - insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula:

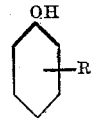

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and finally, said esterified ethylene oxide-modified phenol-aldehyde resin being characterized by the introduction into the resin molecule at the hydroxyl groups of a plurality of divalent radicals having the formula $(C_2H_4O)_n$, and $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

8. Hydrophile synthetic products; said hydrophile synthetic products being oxyethylation products of (A) an ethylene oxide, and (B) an oxyethylation-susceptible, fusible, organic solvent-soluble, water-insoluble, hydroxyacetic acid-esterified ethylene oxide-modified low-stage acid-catalyzed phenol-aldehyde resin; said initial phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula:

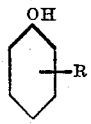

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, aand finally, said esterified ethylene oxide-modified phenol-aldehyde resin being characterized by the introduction into the resin molecule at the hydroxyl groups of a plurality of divalent radicals having the formula $(C_2H_4O)_n$, and $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

9. The product of claim 6, wherein R is substituted in the para position.

10. The product of claim 6, wherein R is a butyl radical substituted in the para position.

11. The product of claim 6, wherein R is an amyl radical substituted in the para position.

12. The product of claim 6, wherein R is an octyl radical substituted in the para position.

13. The product of claim 7, wherein R is substituted in the para position.

14. The product of claim 7, wherein R is a butyl radical substituted in the para position.

15. The product of claim 7, wherein R is an amyl radical substituted in the para position.

16. The product of claim 7, wherein R is an octyl radical substituted in the para position.

17. The product of claim 8, wherein R is substituted in the para position.

18. The product of claim 8, wherein R is a butyl radical substituted in the para position.

19. The product of claim 8, wherein R is an amyl radical substituted in the para position.

20. The product of claim 8, wherein R is an octyl radical substituted in the para position.

MELVIN DE GROOTE.
BERNHARD KEISER.

No references cited.